United States Patent [19]
Dieterich

[11] 3,939,222

[45] Feb. 17, 1976

[54] PRODUCTION OF POLYURETHANE PLASTICS

[75] Inventor: Dieter Dieterich, Leverkusen, Germany

[73] Assignee: Bayer Aktiengesellschaft, Leverkusen, Germany

[22] Filed: Apr. 26, 1974

[21] Appl. No.: 464,600

Related U.S. Application Data

[63] Continuation of Ser. No. 299,513, Oct. 20, 1972, abandoned.

[30] Foreign Application Priority Data

Oct. 26, 1971   Germany............................ 2153269

[52] U.S. Cl. ................ 260/858; 427/340; 427/385; 264/331
[51] Int. Cl.² ......................................... C08L 75/04
[58] Field of Search .................................... 260/858

[56] References Cited
UNITED STATES PATENTS

| | | |
|---|---|---|
| 3,012,987 | 12/1961 | Ansul................................ 260/858 |
| 3,271,352 | 9/1966 | Weinberg............................ 260/858 |
| 3,509,232 | 4/1970 | Schellenberger ................... 260/858 |
| 3,578,728 | 5/1971 | Erhart................................. 260/858 |
| 3,711,571 | 1/1973 | Farah................................. 260/858 |

*Primary Examiner*—Carman J. Seccuro
*Attorney, Agent, or Firm*—Joseph C. Gil; Gene Harsh

[57]   ABSTRACT

A process for the preparation of a polyurethane plastic in the form of coatings on the surface of substrates, from storage-stable liquid mixtures free of solvents and made of solid thermoplastic polyurethanes and polyurethane prepolymers.

A storage-stable liquid system comprising solid polyurethane particles in liquid prepolymers where the two phases are incompatible with each other at the storage temperature.

2 Claims, No Drawings

PRODUCTION OF POLYURETHANE PLASTICS

This is a continuation of application Ser. No. 299,513, filed, Oct. 20, 1972, now abandoned.

The present invention involves a new principle for the production of polyurethane plastics in the form of coatings on the surfaces of substrates, from storage-stable liquid mixtures free of solvents and made of solid thermoplastic polyurethanes or polyureas and polyurethane prepolymers.

Polyurethane plastics can be produced by the polyaddition of isocyanates using as starting materials either highly reactive liquid mixtures, solutions in organic solvents or dispersions in water or thermoplastically deformable granules. By means of such processes high-grade polyurethanes can be produced economically.

A disadvantage of this process is that the polyaddition has to be carried out by the manufacturer of the finished article and this involves dealing with isocyanates and a technology unfamiliar in this branch of the plastics industry. Accordingly, the reaction casting process is only carried out by a few manufacturers specializing in this field.

Polyurethane granules can easily be processed thermoplastically by the usual techniques with the usual extrusion presses and injection molding machines and calenders. However, such apparatus is expensive to buy and the articles thus produced remain thermoplastic which is a disadvantage as regards thermal stability, resistance to deformation, solubility and resistance to hydrolysis.

Neither the reaction molding process nor thermoplastic treatment have, for the reasons stated, become established techniques in the coating of substrates such as textiles, paper, wood or metal.

Until now the use of solutions of polyurethanes in organic solvents have been preferred in these fields. The technique of applying these products, for example by spraying, is simple. However, evaporation of the solvent presents serious problems. The majority of the solvents used are inflammable and/or toxic and therefore require special safety precautions. It is usually necessary to carry out the expensive procedure of recovering the solvent in order to avoid atmospheric pollution. This difficulty is avoided by the use of aqueous dispersions. However, the energy consumption in the evaporation of the water is fairly high.

There is a need for polyurethane compositions which are free of solvents and water and which have a liquid consistency at room or slightly elevated temperature, so that they are simple to treat and mold and which can be hardened by means of a brief thermal shock at high speed without high energy consumption and without evaporation of solvents.

This process makes it possible to prepare such polyurethane compositions.

It has been found that dispersions of solid polyurethane particles in liquid prepolymers are storage-stable liquid systems provided the two phases are incompatible with each other at the storage temperature.

It was found that such systems at elevated temperatures mutually penetrate each other so that both gelation and chemical reaction of the components occurs. Thus a solid, high-molecular polyurethane plastic is obtained.

The subject of this invention is, therefore, a process for the production of solid polyurethane plastics, especially surface coatings from pourable mixtures of prepolymers by heating, characterized in that flowable (i.e., liquid or pasty) mixtures of a. from 30 to 80% by weight (preferably from 40 to 75% by weight) solid thermoplastic polyurethane or polyurea particles with particle diameters in the range of from 0.5 to 300 $\mu$ (preferably from 0.8 to 150 $\mu$) which are insoluble in component b) at least at temperatures below 30°C, as the noncoherent disperse phase and b. from 20 to 70% by weight (preferably from 25 to 60% by weight) of a liquid polyurethane prepolymer as continuous phase, are applied to a surface or placed in a mold and heated to a temperature in the range of from 60° to 230°C (preferably from 80° to 200°C).

As component a) examples of suitable powders are those comprising thermoplastic polyurethanes, polyurethane-ureas or polyureas having in the main particle sizes in the range of from 0.5 to 300 $\mu$. Particle sizes in the range of from 0.8 to 150 $\mu$ are preferred. The particles should preferably have a circular cross-section and a smooth surface. With particles having these properties high concentrations (up to 80%) are obtained together with acceptable flow properties.

Suitable powders that may be used as component a) in the process of the invention are polyurethane, polyurethane-urea or polyurea powders which are thermoplastic, this means which have a softening point according to the ring and ball method of at most 200°C preferably of 110° - 180°C and which are insoluble in the component b) at temperatures of preferably below 50°C and especially of below 30°C and which are soluble in component b) at temperatures of above 60° and especially above 80°C. The mixtures of components a) and b) can be stored at those temperatures where component a) is insoluble in component b), they are processed at those temperatures at which component a) is soluble in component b). The difference between storage temperature and the process temperature at which a chemical reaction between a) and b) takes place should be at least 30°C and is preferably greater than 60°C.

Powders of polyester and/or polyether urethanes of high molecular weight (up to 200,000) are preferred. However, if functional groups are present with which component b) can react, the molecular weight can be less than 20,000, provided insolubility in component b) is ensured. In order to keep the solubility in the prepolymer b) as low as possible, the component a) should show crystallizing segments at temperatures below 30°C. Products based on crystallizable polyester or polyether diols are especially suitable. Examples of such crystallizable polyhydroxy compounds, in particular having a molecular weight of 300 to 10,000, are the following: polyethylene glycol, polytetrahydrofurane, polycaprolactone, ethyleneglycolopolyadipate, 1,4-butanediol-polyadipate, 1,6-hexanediol-polyadipate, 1,6-hexanediol-polysuccinate, 1,6-hexanediol-polycarbonate and tetraethyleneglycolpolycarbonate.

When using non-crystallizing polyethers or polyesters, compatibility is ensured by using high-melting urethane or preferably urea or amide units. These segments should preferably be substantially free of solubilizing alkyl side-groups. 1,4-butanediol, ethyleneglycol, 1,6-hexanediol, ethylenediamine, propylenediamine, butylenediamine, hexamethylenediamine and adipic acid are, for example, particularly suitable as chain lengtheners. The required insolubility of component a) in prepolymer b) can also be achieved by means of ionic centers in component a).

In order to obtain high-molecular but thermoplastic products, it is preferably to employ bifunctional reaction components. The coemployment of trifunctional components is preferably compensated by small amounts of monofunctional chain-stoppers.

Polyurethanes are obtained if above polyhydroxy compounds are reacted with polyisocyanates in known manner. Polyurethane-ureas are obtained if polyhydroxy compounds and polyamino compounds are reacted with polyisocyanates. Typical polyurethane-ureas are those which are prepared from polyhydroxy polyesters and/or polyethers, polyisocyanates and di-amino compounds as chain-lengthening agents. Polyureas are obtained if polyamino compounds are exclusively reacted with polyisocyanates. Thus it is possible to prepare polyureas which are suitable as compound a) in the process of the invention from above polyhydroxy polyethers the terminal hydroxy groups of which are converted in known manner into amino groups by reaction with ammonia, diaminoalkane chain-lengthening agents and diisocyanates.

The powder particles can be produced by various known methods. Possible methods are described for example in U.S. Pat. Nos. 3,402,149, 3,236,812, 3,213,049 and 3,496,045; U.S. Pat. application Nos. 234,315 filed on Mar. 24, 1969, 105,982 filed on Jan. 12, 1971 and 828,369 filed on May 27, 1969; Belgian Pat. Nos. 664,168 and 705,782; British Pat. No. 1,118,617; German Offenlegungsschrift 1,901,950; and Japanese Pat. No. 18 358/67. Powder particles which are suitable as component a) in the process of the invention are also obtainable from polyurethane dispersions described in U.S. Pat. No. 3,479,310 or in U.S. pat. application No. 224,699 filed on Feb. 9, 1972 by converting the dispersed polyurethanes into polyurethane powders by the well-known freeze-drying or spray-drying techniques. Suitable powders which may be used as component a) in the process of the invention may also be obtained by preparing polyurethane dispersions according to the teaching of U.S. Pat. No. 3,479,310 with the only difference that the content of ionic groups which according to U.S. Pat. No. 3,479,310 is from about 0,02 to about 1 % by weight is maintained below 0,02 % by weight thus providing dispersions which form powdery sediments.

Of course, it is also possible to pulverize simple thermoplastic polyurethane elastomers to the desired particle size, for instance while cooling with solid carbon dioxide. Dispersions in which component a) has an average particle size of less than 100 μ are especially preferred.

As component b), liquid polyurethane prepolymers, as known in the art, are employed. In their construction it is preferable to avoid crystallizing segments. As a rule it is preferable to use liquid polyester and/or polyether polyols having a molecular weight in the range of from 400 to 6,000, preferably having alkyl side-groups, as described for example in Kunststoff-Handbuch, Volume VII, Polyurethanes, Carl Hanser Verlag, Munich, 1966, pages 45–74, as well as chain lengtheners of known type having molecular weights in the range of 18 to 400, preferably with side groups. It is also possible to use trifunctional components in addition. As isocyanates the known aliphatic, cycloaliphatic, araliphatic and aromatic polyisocyanates can be used, such as 1,4-tetramethylenediisocyanate, 1,6-hexamethylenediisocyanate, 1,12-dodecanediisocyanate, cyclohexane-1,3- and -1,4-diisocyanate as well as any desired mixtures of these isomers, 1-isocyanato-3,3,5-trimethyl-5-isocyanato-methyl-cyclohexane, 1,3- and 1,4-phenylenediisocyanate, 2,4- and 2,6-toluene-diisocyanate as well as any desired mixtures of these isomers, diphenylmethane-4,4'-diisocyanate, naphthylene-1,5-diisocyanate, triphenylmethane-4,4',4''-triisocyanate, polyphenyl-polymethylenepolyisocyanates, as obtained by anilineformaldehyde condensation followed by phosgenation, polyisocyanates having carbodiimid-isocyanate adducts as obtained according to German Pat. No. 1,092,007, diisocyanates as described in U.S. Pat. No. 3,492,330, polyisocyanates having allophanate groups as described in British Pat. No. 994,890, Belgian Pat. No. 761,626 and in the published Dutch Pat. Application No. 7,102,524, polyisocyanates having isocyanurate groups as described in German Pat Nos. 1,022,789 and 1,027,394 as well as in the German Offenlegungsschriften Nos. 1,929,034 and 2,004,048 polyisocyanates having biuret groups as described in German Patent No. 1,101,394, in British Pat. No. 889,050 and in French Pat. No. 7,017,514, polyisocyanates prepared by telomerization reactions as described in Belgian Pat. No. 723,640, polyisocyanates having ester groups in accordance with British Pat. Nos. 956,474 and 1,072,956, aliphatic, cycloaliphatic, araliphatic or aromatic polyisocyanates as mentioned by W. Siefgen in Justus Liebig's Annalen der Chemie, 562, pages 75 to 136, or reaction products of the above mentioned isocyanates with acetals as in German Pat. No. 1.072,385 or isocyanates as mentioned in German Pat. Nos. 1,022,789 and 1,027,394.

Of course, it is also possible to use any desired mixtures of the above polyisocyanates in the present invention.

Aliphatic and cycloaliphatic polyisocyanates such as 1,6- hexamethylenediisocyanate, m-xylylenediisocyanate, trimethylhexamethylenediisocyanate, 1-isocyanato-3,3,5-trimethyl-5-isocyanato-methylcyclohexane are particularly suitable. NCO groups are especially suitable as reactive terminal groups but other terminal groups such as hydroxyl, amino, COOH and SH may also be used. The components b) should preferably be so chosen that they are able to react with the components a) at the gelling temperature. For example NCO groups of b) react with urethane, urea, amido, carboxyl or hydroxyl groups. Most especially, high storage stability is attained with masked NCO prepolymers. Component a) may also have NCO groups, which may be masked.

Liquid mixtures of the starting compounds forming component b) are also to be understood in the context of the present invention as included under polyurethane prepolymers. If, for example, the liquid polyurethane compositions of the invention are prepared only shortly before the reaction and therefore need only have a very limited storage stability, then it is only necessary to employ mixtures of component a), a polyol and a molar excess, calculated on the polyol, of a polyisocyanate. In such compositions too the isocyanate component can, of course also be employed in masked form thus again achieving almost unlimited storage stability. Owing to the very low viscosity of component b), mixtures can be produced consisting of up to 80% of the powdered component a).

Of particular interest are also those polyurethane prepolymers which consist of an oligourethane free of NCO groups and a low molecular reactive component, for example a formaldehyde derivative, which, within the gelation temperature range, links the oligourethanes with each other and perhaps with a).

The viscosity of the prepolymer can vary within wide limits, for example between 100 cP and 500,000 cP. The preferred viscosity is in the range of from 1,000 to 100,000 cP at 20°C.

The mixture of a) and b) are generally prepared by simple stirring component a) into component b) at temperatures at which component a) is not yet soluble in component b) this means preferably at 20° – 50°C.

The liquid mixtures of a) and b) are generally free of volatile compounds, especially of organic solvents. For the production of very thin coatings, especially in the case of application by spraying, the mixtures of the invention can also contain small amounts, for example up to 10% of inert solvents, such as water, ethanol, isopropanol, perchloroethylene or benzine, in order to reduce the viscosity temporarily. A reduction of viscosity can also be brought about by the addition of conventional plasticizers such as dioctylphthalate or triphenylphosphate.

However, for reasons of ease of handling of the systems and freedom from bubbles of the end products, it is best to work in the absence of solvents.

In many cases they are stable for several months without significant increase in viscosity. In the case of inadequate solubility of the component a) in the component b) or if b) itself is a reactive mixture, the pot life nevertheless is usually more than 24 hours. Of course, mixtures can also be prepared that are handled like reactive two-component systems the pot life of which is only about 2 to 24 hours.

The mixtures can be treated by the usual techniques such as pouring, extruding, injection molding, spraying, brushing, printing or calendering.

The molded mixtures can be solidified very simply by short or longer heating whereupon the two phases mutually penetrate each other and thus, in addition to a possible chemical reaction, a gelation process commences. After cooling, a solid polyurethane plastic has been produced. Owing to freedom from solvent and controllable viscosity, they are particularly simple to use and cause no waste gas or water problems.

EXAMPLE 1

Preparation of a polyurethane powder:
a. Preparation of the starting material

About a 40% aqueous dispersion of a polyurethane is prepared in known manner from the polyaddition product of about 250 parts of a polypropylene glycol ether (OH number 56), about 224 parts of a 65:35 isomeric mixture of 2,4- and 2,6-tolylene diisocyanate, about 104 parts of neopentyl glycol and a reaction mixture of about 8 parts of ethylene diamine, about 15 parts of propane sultone and about 70 parts of about a 10% aqueous potassium hydroxide solution in about 50 ml. of water.

The polyurethane has a hardness of 64 degrees Shore D (as measured on a test specimen) and a softening range of about 120° to about 140°C.

b. Preparation of the polyurethane powder

The aqueous polyurethane dispersion described in part a) is sprayed into a spray dryer through a standard two-component nozzle having a diameter of about 2 mm. and run on compressed air at about 5 atmospheres, and dried in a stream of hot air. The air temperatures used are about 70°C. at the dryer inlet and about 40°C. at the dryer outlet. The product is discharged by way of a cyclone. The dry powder thus obtained is found to contain less than about 1% by weight of residual moisture. The product can be redispersed in water by stirring for about one hour at about 40° to 50°C. Smooth transparent and waterproof coatings can be obtained from the dispersion by pouring it onto cardboard followed by drying at about 130°C.

50 parts of the polyurethane powder prepared as described hereinbefore, the particle size of which was in the range of from 0.9 to 120µ was mixed by stirring with 50 parts of an adduct of the formula

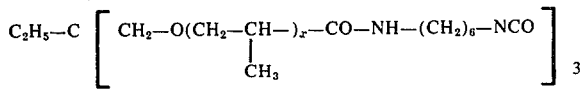

of molecular weight 3,500. A milk-white, very easily flowing dispersion was obtained having a solids content of 100%. If moisture was excluded, the dispersion was stable for at least 24 hours. On using a powder with a moisture content of less than 0.05% the storage stability was at least 7 days.

Coatings of the dispersion on glass plates could be fired to give solid non-adherent, almost transparent, wear-resistant polyurethane coatings in 20 minutes at 160°C, or in 5 minutes at 190°C or in 2 minutes at 200°C. The coatings had a smooth brilliant surface and were completely homogeneous.

EXAMPLE 2

The dispersion described in Example 1 was poured into a mold coated with silicone oil and the mold was heated for 30 minutes at 170°C. After cooling, the finished solid homogeneous polyurethane elastomer could be removed from the mold.

EXAMPLE 3

Example 1 was repeated except for the use of a finely powdered thermoplastic polyurethane elastomer prepared from an adipic acid/ethyleneglycol polyester of mol. wt. 2000, butanediol-1,4 and 4,4-diphenylmethanediisocyanate in the NCO/OH ratio of 1.01. The pulverization was carried out with a striking-plate mill with the addition of solid carbon dioxide. By screening, a fraction with a particle size of from 50 to 300 µ was obtained. 35 parts of this powder were mixed with 65 parts of the liquid adduct of Example 1. Even after the mixture had been stored for 14 days the viscosity had not appreciably changed.

The viscous paste was coated 1.2 mm thick on to a fabric. It was heated 5 minutes at 190°C to give a homogeneous wear-resistant coating.

EXAMPLE 4

30 parts of the powder used in example 1 were mixed at 40°C with 70 parts of the prepolymer A described below, to give a milk-white stable dispersion.

A steel plate was coated about 0.2 mm thick with the dispersion and hardened for 2 minutes at 210°C. A smooth homogeneous non-sticky wear-resistant coating with excellent adhesion was produced.

Prepolymer A:

1,000 g of an adipic acid/diethyleneglycol polyester having a molecular weight of 2,600, 6.7 g trimethylolpropane and 194.9 g isophorondiisocyanate were made to react for 5 hours at 80° – 90°C.

EXAMPLE 5

70 parts of the powder of Example 1 were mixed by stirring with 30 parts of an adduct of the formula:

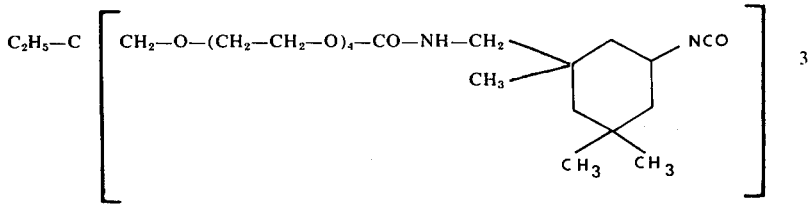

Transparent hard coatings were obtained by treating coatings of the dispersion on glass plates as in Example 1.

EXAMPLE 6

75 parts of the powder of Example 1 was made into a paste with 20 parts of trishydroxyethyl-trimethylolpropane and 5 parts hexanediol -1,6. The storage-stable dispersion was mixed before use with 25 parts of 2,4'-diphenylmethane-diisocyanate poured into a mold and heated for 10 minutes at 170°C. A hard, tough mold article was obtained.

It is to be understood that in the foregoing examples, parts are by weight unless otherwise indicated and that these examples are given for the purpose of illustration and are not intended to be limiting in any way.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A storage stable dispersion of solid polyurethane or polyurea particles (a) in a liquid prepolymer (b) (liquid or pasty) suitable for the production of polyurethane plastics substantially without the use of added solvents where the dispersion comprises two components a. 30–80 wt. % solid thermoplastic polyurethane or polyurea particles having particle sizes between 0.5–300μ and a ring and ball softening point below about 200°C. which are insoluble in component b) at temperatures below at least 30°C. and which are soluble in component b) at temperatures above about 80°C. as noncoherent disperse phase and
   b. 20–70 wt. % of a liquid polyurethane prepolymer as coherent phase.

2. The mixture of claim 1 wherein the component a) is 40 – 75 wt. % solid thermoplastic polyurethane or polyurea particles having particle sizes between 0.8 – 150 μ and component b) is 25 – 60 wt. % of a liquid polyurethane prepolymer as coherent phase.

* * * * *